US008260934B2

(12) United States Patent
Sigal

(10) Patent No.: US 8,260,934 B2
(45) Date of Patent: Sep. 4, 2012

(54) MULTIPLEX TRANSPORT

(75) Inventor: Ron Sigal, Kingston, NY (US)

(73) Assignee: Red Hat, Inc., Raleigh, NC (US)

( * ) Notice: Subject to any disclaimer, the term of this patent is extended or adjusted under 35 U.S.C. 154(b) by 1149 days.

(21) Appl. No.: 11/897,563

(22) Filed: Aug. 31, 2007

(65) Prior Publication Data
US 2009/0064207 A1 Mar. 5, 2009

(51) Int. Cl.
G06F 15/16 (2006.01)
(52) U.S. Cl. .......................... 709/227; 709/228; 709/203
(58) Field of Classification Search .................. 709/232, 709/227–228, 217–219, 203
See application file for complete search history.

(56) References Cited

U.S. PATENT DOCUMENTS

| 5,497,463 | A  | * | 3/1996 | Stein et al. | 709/203 |
| 5,619,650 | A  | * | 4/1997 | Bach et al. | 709/230 |
| 5,867,661 | A  | * | 2/1999 | Bittinger et al. | 709/227 |
| 6,618,765 | B1 | * | 9/2003 | Banctel et al. | 719/315 |
| 6,859,835 | B1 | * | 2/2005 | Hipp | 709/227 |
| 6,922,727 | B2 | * | 7/2005 | Banerjee | 709/227 |
| 7,231,446 | B2 | * | 6/2007 | Peiffer et al. | 709/219 |
| 7,486,698 | B2 | * | 2/2009 | Betts et al. | 370/469 |
| 7,769,869 | B2 | * | 8/2010 | Venkatraman et al. | 709/227 |
| 2005/0071857 | A1 | * | 3/2005 | Wang et al. | 719/330 |
| 2006/0291502 | A1 | * | 12/2006 | Kalofonos | 370/466 |
| 2007/0247395 | A1 | * | 10/2007 | Barraclough et al. | 345/51 |
| 2008/0155103 | A1 | * | 6/2008 | Bailey | 709/227 |

OTHER PUBLICATIONS

JDJ, Using Virtual Sockets to Fix Software Broken by Firewalls, pp. 1-5, http://jdj.sys-con.com/read/216367_p.htm, 2007 SYS-CON Media Inc.
John Mazzitelli, Introducing JBoss Remoting, Feb. 23, 2005, pp. 1-7, Published on ONJava.com.
Ron Sigal; Tom Elrod, Using Virtual Sockets to Fix Software Broken by Firewalls Without Violating Security, JDJ Magazine May 2006, Volume: 11 Issue: 5, pp. 38-41.
Ron Sigal, The Multiplex Subsystem of the JBoss Remoting Projects, Jul. 4, 2006, pp. 1-29.
JBoss Remoting Guide, JBoss Remoting Version 2.0.0.GA, Aug. 29, 2006, Copyright 2006 JBoss, Inc., 146 pages.

* cited by examiner

Primary Examiner — Philip B Tran
(74) Attorney, Agent, or Firm — Lowenstein Sandler PC

(57) ABSTRACT

A remoting client and a remoting server are described. In one embodiment, the remoting client has a client remote access application comprising an application programming interface (API), and a client invoker coupled to the client remote access application, the socket invoker comprising a multiplex invoker. The multiplex invoker is to form a socket on the remoting client, to bind the socket to a port of the remoting client, to couple the socket to a socket of a remoting server, to form a plurality of virtual sockets on the remoting client, and to associate the plurality of virtual sockets with the socket of the remoting client. The plurality of virtual sockets share the socket and the port of the remoting client.

30 Claims, 11 Drawing Sheets

US 8,260,934 B2

MULTIPLEX TRANSPORT

TECHNICAL FIELD

Embodiments of the present invention relate to network communication, and more specifically to network based invocations.

BACKGROUND

Remote procedure calls (RPC) allow a computer program to cause a subroutine or procedure to execute in another address space (commonly on another computer on a shared network) without the programmer explicitly coding the details for this remote interaction. That is, the programmer would write essentially the same code whether the subroutine is local to the executing program, or remote. When the software is written using object-oriented principles, RPC may also be referred to as remote invocation or remote method invocation.

Current remoting method invocations include, for example, RMI, EJB, and web services. The Java Remote Method Invocation API, or Java RMI, is a Java application programming interface for performing the object equivalent of remote procedure calls.

There are two common implementations of the API. The original implementation depends on Java Virtual Machine (JVM) class representation mechanisms and it thus only supports making calls from one JVM to another. The protocol underlying this Java-only implementation is known as Java Remote Method Protocol (JRMP). In order to support code running in a non-JVM context, a CORBA version was later developed. RMI may refer to the programming interface or may signify both the API and JRMP, whereas the term RMI-IIOP, read RMI over IIOP, denotes the RMI interface delegating most of the functionality to the supporting CORBA implementation.

The original RMI API was generalized somewhat to support different implementations, such as an HTTP transport. Additionally, work was done to CORBA, adding a pass by value capability, to support the RMI interface. Still, the RMI-IIOP and JRMP implementations are not fully identical in their interfaces.

A socket invoker or transport utitilizes available socket connections from a pool of sockets. However, it would be desirable to conserve socket resources because of firewall restrictions on port availability. A need therefore exists for an apparatus and a method to support multiple streams of communication over a single pair of sockets.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for supporting multiple streams of communication over a single pair of sockets between a remoting client and a remoting server. A multiplex transport in the remoting client and the remoting server form virtual sockets capable of sharing the pair of sockets.

General Architecture

Figure 1:
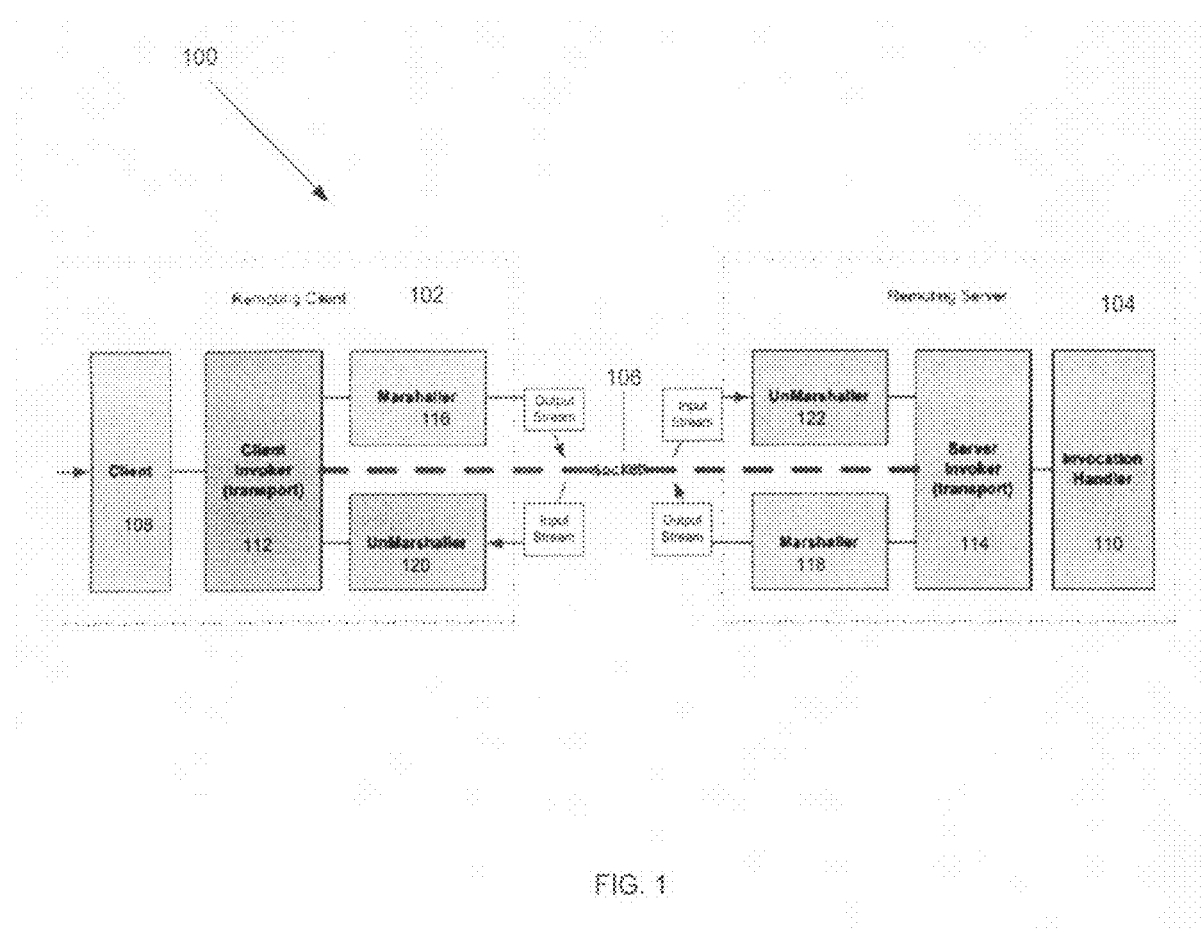
FIG. 1 illustrates a network architecture in which embodiments of the present invention may be implemented.

FIG. 1 illustrates an exemplary architecture 100 comprising a remoting client 102 coupled to a remoting server 104 via a network 106. A remoting framework with a single, simple application programming interface (API) for making network based invocations and other network related services is described. An example of a remoting framework is described in JBoss Remoting. The purpose of JBoss Remoting is to provide a single API for most network based invocations and related service that uses pluggable transports and data marshallers. The JBossRemoting API provides the ability for making synchronous and asynchronous remote calls, push and pull callbacks, and automatic discovery of remoting servers. The intention is to allow for the use of different transports to fit different needs, yet still maintain the same API for making the remote invocations and only requiring configuration changes, not code changes.

One important component of the JBoss Remoting architecture is how servers are identified. This is done via an InvokerLocator, which can be represented by a simple String with a URL based format (e.g., socket://myhost:5400). This is all that is required to either create a remoting server or to make a call on a remoting server. The remoting framework will then take the information embedded within the InvokerLocator and construct the underlying remoting components needed and build the full stack required for either making or receiving remote invocations.

Some examplary features of JBoss Remoting include server identification, pluggable transports, pluggable data marshallers, automatic discovery, server grouping, callbacks, asynchronous calls, local invocation, remote classloading, and sending of streams. In server identification, a simple string identifier allows for remoting servers to be identified and called upon. In pluggable transports, different protocol transports can be used such as socket, rmi, http, etc., via the same remoting API. In pluggable data marshallers, different data marshallers and unmarshallers can be used to convert the invocation payloads into desired data format for wire transfer. In automatic detection, remoting servers can be detected as they come on and off line. Server grouping gives the ability to group servers by logical domains, so that servers can only communicate within specified domains. Server callbacks can be received via push and pull models. Pull model allows for persistent stores and memory management. Asynchronous or one way calls can be made to the server. If an invocation on a remoting server that is within the same process space, remoting will automatically make this call by reference, to improve performance. Remote classloading allows for classes, such as custom marshallers, that do not exist within client to be loaded from the server. Sending of streams allows for clients to send input streams to the server, which can be read on demand on the server.

There are several layers to this framework that mirror each other on the client and server side. The outermost layer is the one which the user interacts with—e.g. the remote access application. On the client side, this is the Client API 108 class upon which the user will make its calls. In other words, this can be the external API access point for client code. On the server side, this is the InvocationHandler 110, which is implemented by the user and is the ultimate receiver of invocation requests. Next is the transport, which is controlled by the invoker layers 112, 114. Finally, at the lowest layer are the Marshallers 116, 118 that convert data format to wire format and the UnMarshallers 120, 122 that convert wire format to data format.

When a user calls on the Client API 108 to make an invocation, it will pass this invocation request to the appropriate Client Invoker 112, based on the transport specified by the locator url. Client Invoker 112 will then use Marshaller 116 to convert the invocation request object to the proper data format to send over network 106 to Remoting Server 104.

On the server side, UnMarshaller 122 receives this data from the network 106, converts it back into a standard invocation request object, and sends it on to the Server Invoker 114. The Server Invoker 114 then passes this invocation request on to the user's implementation of the Invocation Handler 110. The response from Invocation Handler 110 passes back through Server Invoker 114 and on to Marshaller 118, which will then convert the invocation response object to the proper data format and send back to Remoting Client 102. UnMarshaller 120 on Remoting Client 102 converts the invocation response from wire data format into standard invocation response object, which will be passed back up through Client Invoker 112 and Client API 108 to the original caller.

Remoting Client

Figure 2:
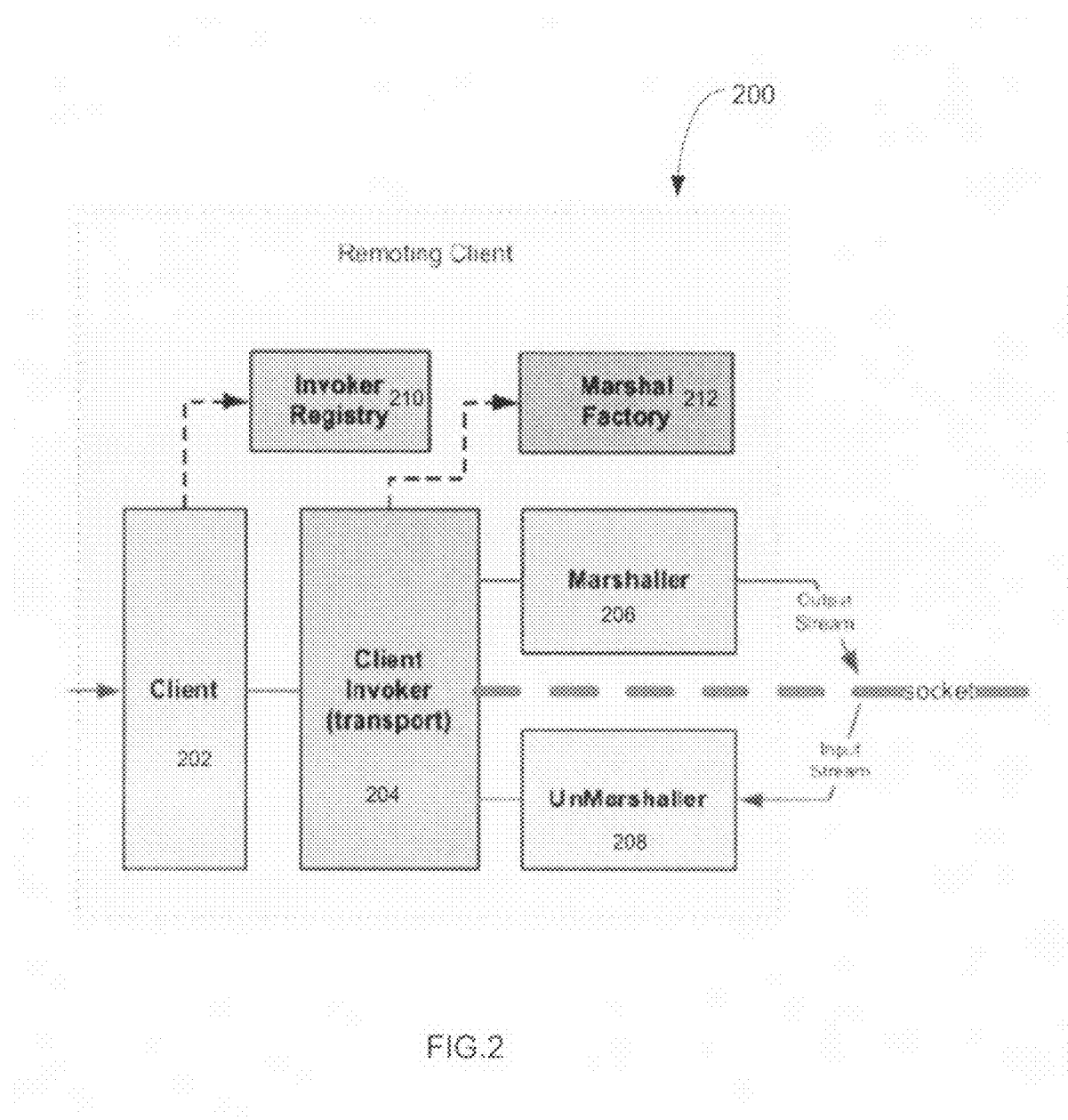
FIG. 2 illustrates a block diagram of one embodiment of a remoting client.

FIG. 2 illustrates a block diagram of one embodiment of a remoting client 200. For determining which client invoker to use, the Client API 202 will pass the InvokerRegistry 210 the locator for the target server it wishes to make invocations on. The InvokerRegistry 210 will return the appropriate client invoker instance based on information contained within the locator, such as transport type. The client invoker 204 will then call upon the MarshalFactory 212 to get the appropriate Marshaller 206 and UnMarshaller 208 for converting the invocation objects to the proper data format for wire transfer. All invokers have a default data type that can be used to get the proper marshal instaces, but can be overridden within the locator specified.

Remoting Server

Figure 3:
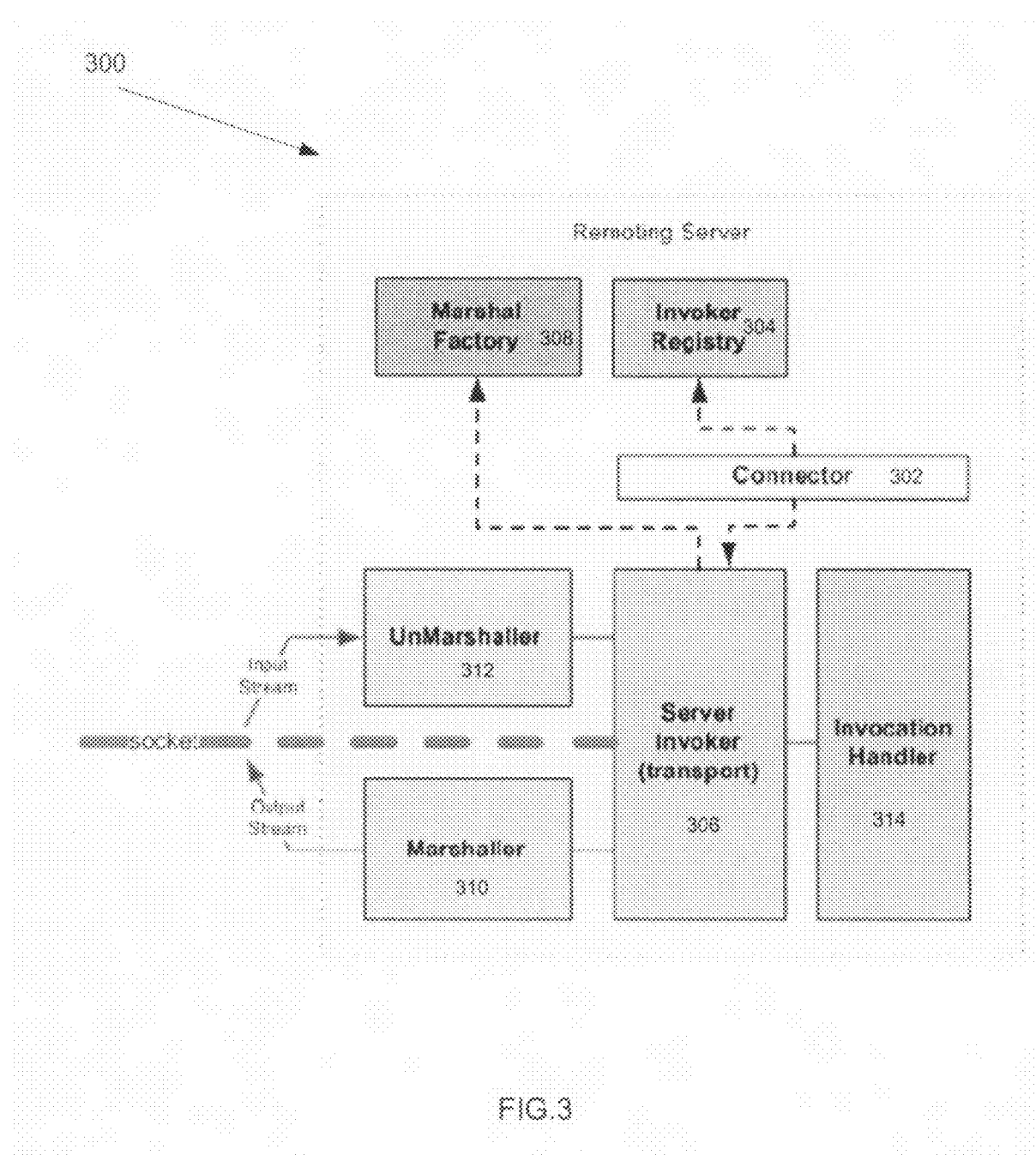
FIG. 3 illustrates a block diagram of one embodiment of a remoting server.

FIG. 3 illustrates a block diagram of one embodiment of a remoting server 300. On the server side, it is the Connector class 302 that is used as the external point for configuration and control of the remoting server 300. The Connector class 302 will call on the InvokerRegistry 304 with its locator to create a Server Invoker 306. Once the server invoker 306 is returned, Connector 302 then registers the invocation handlers 314 on it. Server Invoker 306 uses the MarshalFactory 308 to obtain the proper marshal instances, Marshaller 310, and UnMarshaller 312 as is done on the client side.

Detection

Figure 4:
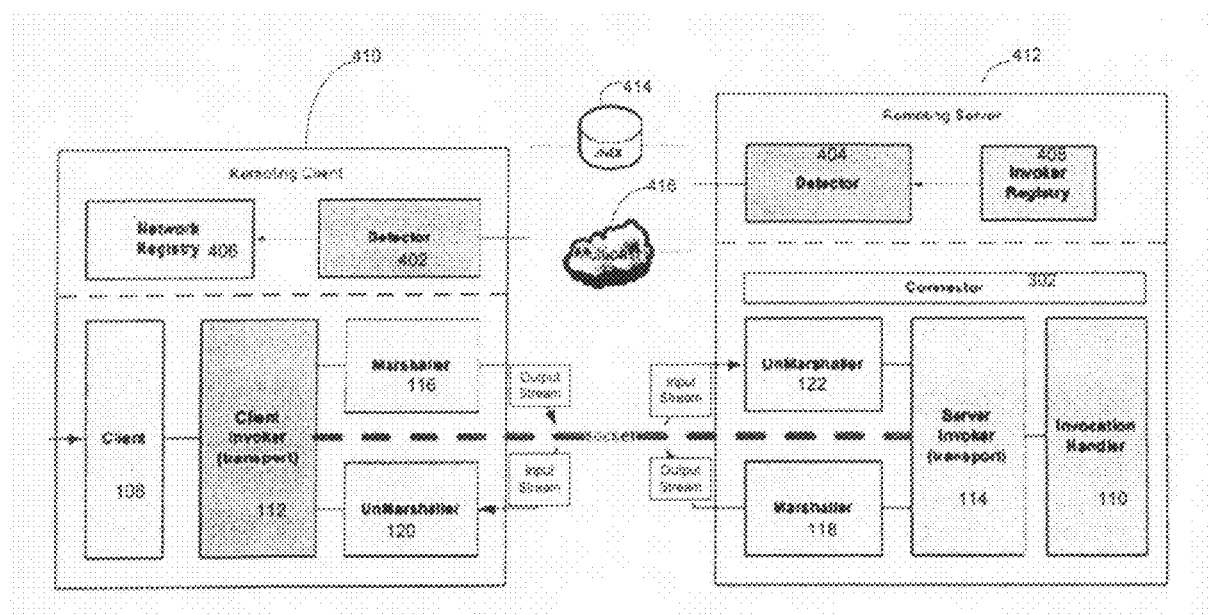
FIG. 4 illustrates a block diagram of another embodiment of a network architecture.

FIG. 4 illustrates a block diagram of another embodiment of a network architecture 400. To add automatic detection, a remoting Detector 402, 404 will need to be added on both the remoting client 410 and the remoting server 412. A Network Registry 406 is added to the remoting client 410. An Invoker Registry 408 is added to the remoting server 412.

When Detector 404 on the server side is created and started, it will periodically pull from the Invoker Registry 408 all the server invokers that it has created. The detector 404 will then use the information to publish a detection message containing the locator and subsystems supported by each server invoker. The publishing of this detection message may be either via a multicast broadcast or a binding into a JNDI server. On the client side, Detector 402 will either receive the multicast broadcast message or poll the JNDI server for detection messages. If Detector 402 determines a detection message is for a remoting server 412 that just came online, it will register it in the Network Registry 406. Network Registry 406 houses the detection information for all the discovered remoting servers. Network Registry 406 may also emit a JMX notification upon any change to this registry of remoting servers. The change to the Network Registry 406 can also be for when Detector 402 has discovered that a remoting server is no longer available and removes it from the registry.

Machine Architecture

Figure 5:
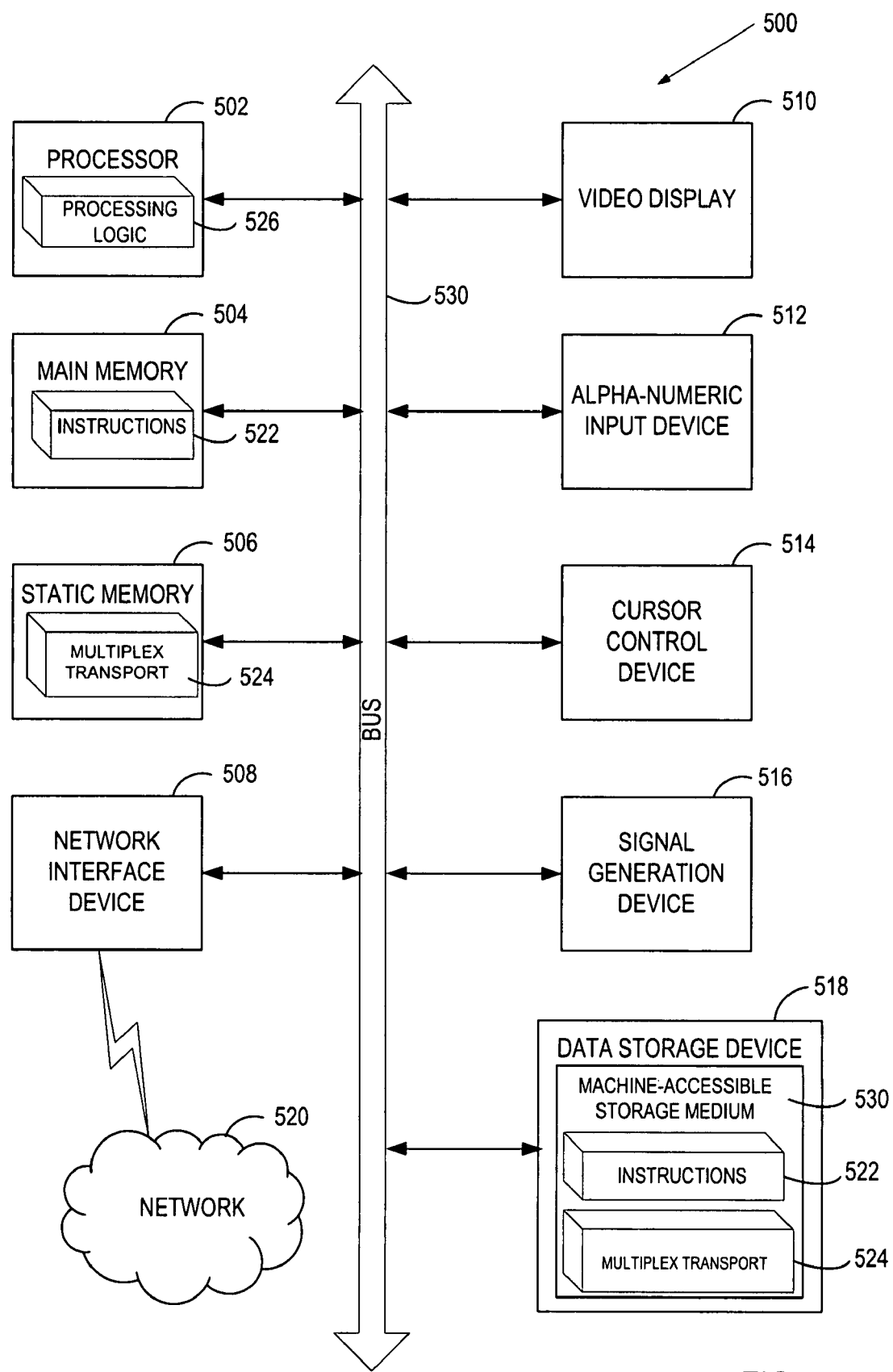
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store versioning compatibility processes 524 as described above. The versioning compatibility 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Server Socket Invoker

When the socket server invoker is started, it will create one, and only one, instance of java.net.ServerSocket. Upon being started, it will also create and start a number of threads to be used for accepting incoming requests from the ServerSocket. These threads are called the accept threads and the number of them created is controlled by the 'numAcceptThreads' property. When these accept threads are started, they will call accept( ) on the ServerSocket and block until the ServerSocket receives a request from a client, where it will return a Socket back to the accept thread who called the accept( ) method. As soon as this happens, the accept thread will try to pass off the Socket to another thread for processing.

The threads that actually process the incoming request, referred to as server threads, are stored in a pool. The accept thread will try to retrieve the first available server thread from the pool and hand off the Socket for processing. If the pool does not contain any available server threads and the max pool size has not been reached, a new server thread will be created for processing. Otherwise, if the max pool size has been reached, the accept thread will wait for one to become available (will wait until socket timeout has been reached). The size of the server thread pool is defined by the 'maxPoolSize' property. As soon as the accept thread has been able to hand off the Socket to a server thread for processing, it will loop back to ServerSocket and call accept( ) on it again. This will continue until the socket server invoker is stopped.

The server thread processing the request will be the thread of execution through the unmarshalling of the data, calling on the server invocation handler, and marshalling of response back to the client. After the response has been sent, the server thread will then hold the socket connection and wait for another request to come from this client. It will wait until the socket is closed by the client, a socket timeout occurs, or receives another request from the client in which to process. When the client socket connection session is closed, meaning timeout or client closed socket connection, then the thread will return itself to the pool.

If all the server threads from the pool are in use, meaning have a client connection established, and the pool has reached its maximum value, the accept threads (no matter how many there are) will have to wait until one of the server threads is available for processing. This why having a large number of accept threads does not provide any real benefit. If all the accept threads are blocked waiting for server thread, new client requests will then be queued until it can be accepted. The number of requests that can be queued is controlled by the backlog and can be useful in managing sudden bursts in requests.

If take an example with a socket server invoker that has max pool set to 300, accept threads is 2, and backlog is 200, will be able to make 502 concurrent client calls. The 503rd client request will get an exception immediately. However, this does not mean all 502 requests will be guaranteed to be processed, only the first 300 (as they have server threads available to do the processing). If 202 of the server threads finish processing their requests from their initial client connections and the connection is released before the timeout for the other 202 that are waiting (200 for backlog and 2 for accept thread), then they will be processed (of course this is a request by request determination).

Client Socket Invoker

When the socket client invoker makes its first invocation, it will check to see if there is an available socket connection in its pool. Since is the first invocation, there will not be and will create a new socket connection and use it for making the invocation. Then when finished making invocation, will return the still active socket connection to the pool. As more client invocations are made, is possible for the number of socket connections to reach the maximum allowed (which is controlled by 'clientMaxPoolSize' property). At this point, when the next client invocation is made, it will keep trying to get an available connection from the pool, waiting 1 second in between tries for up to maximum number of retries (which is controlled by the numberOfRetries property). If runs out of retries, will throw SocketException saying how long it waited to find avaiable socket connection.

Once the socket client invoker goes get an available socket connection from the pool, are not out of the woods yet. There is still a possibility that the socket connection returned, while still appearing to be valid, has timed out while sitting in the pool. So if discover this while trying to make invocation, will throw it away and retry the whole process again. Will do this up to the number set by the numberOfCallRetries before throwing an exception. The trick here is that when get to numberOfCallRetries −2, will assume that any socket connection gotten from the pool will have timed out and will flush the pool all together so that the next retry will cause a new socket connection to be recreated. A typical scenario when this might occur is when have had a burst of client invocations and then a long period of inactivity.

Multiplex Invoker

The multiplex invoker is intended to replicate the functionality of the socket invoker with the added feature that it supports multiple streams of communication over a single pair of sockets. Multiplexing may be motivated by, for example, a desire to conserve socket resources or by firewall restrictions on port availability. This additional service is made possible by the Multiplex subproject, which provides "virtual" sockets and "virtual" server sockets.

In a typical multiplexed scenario a Client on a client host, through a MultiplexClientInvoker C, could make synchronous method invocations to a MultiplexServerInvoker on a server host, and at the same time (and over the same TCP connection) asynchronous push callbacks could be made to a MultiplexServerInvoker S on the client host. In this, the Prime Scenario, which motivated the creation of the multiplex invoker, C and S use two different virtual sockets but share the same port and same actual socket. We say that C and S belong to the same invoker group.

Since Remoting is the principal client of Multiplex, we illustrate multiplexing primarily in the context of a Remoting application. Remoting supports two modes of client-server communication: (1) method calls from client to server, with a synchronous response, and (2) client requests for an asynchronous callback from the server. The usual need for separate ports to support both synchronous and asynchronous modes is obviated by the Multiplexing subsystem.

Figure 6:
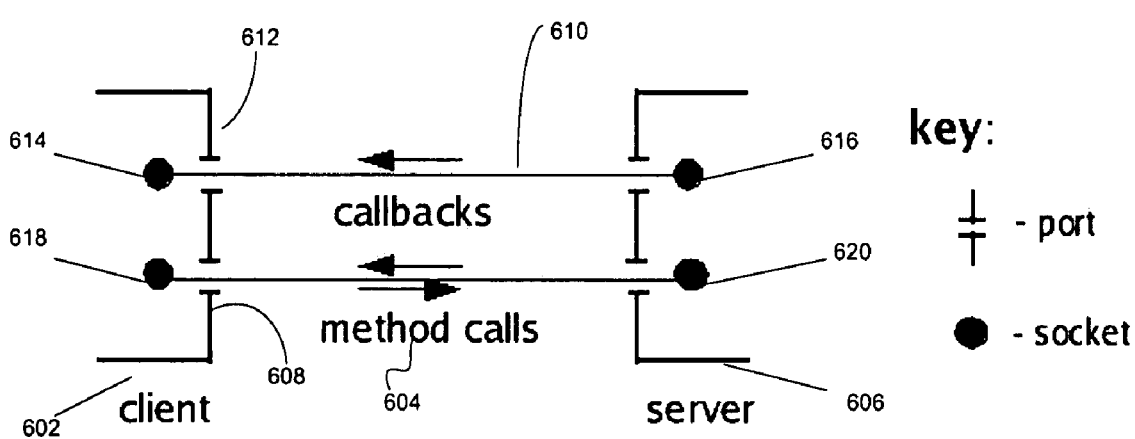
FIG. 6 illustrates a remoting method call and callback with no port restrictions.

FIG. 6 illustrates a remoting method call and callback with no port restrictions requiring no multiplexing since several port may be used. A client 602 places a method call 604 with a synchronous response to a server 606 with a first port 608 with sockets 618, 620. Client 604 requests for an synchronous callback 610 from server 606 with a second port 612 with sockets 614, 616.

Figure 7:
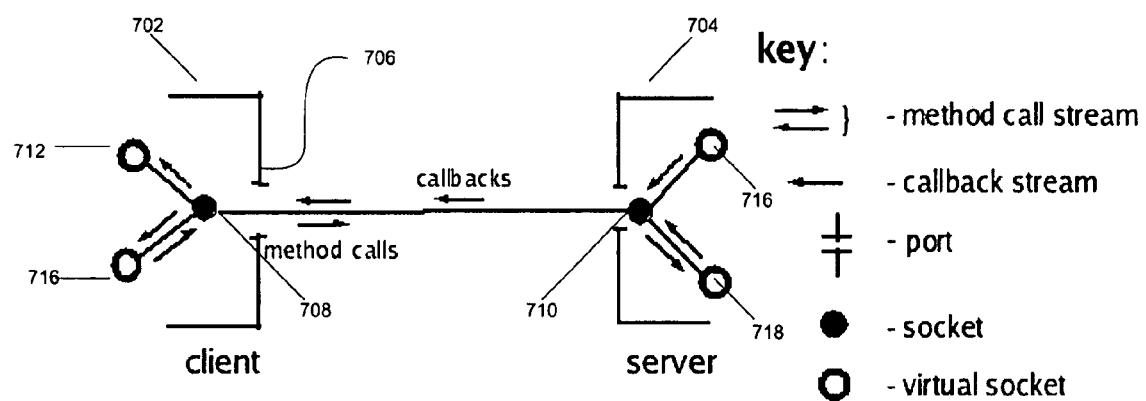
FIG. 7 illustrates a remoting method call and callback in accordance with one embodiment.

FIG. 7 illustrates a remoting method call and callback in accordance with one embodiment. The embodiment of FIG. 7 may also be referred to as the "prime scenario". Client 702 may communicate with server 704 via a single port 706 and a pair of sockets 708, 710. The communication may include both method calls and asynchronous callbacks on the same port 706. On the client side, virtual sockets 712, 714 are associated with actual socket 708. On the server side, virtual sockets 716, 718 are associated with actual socket 710.

Multiplexing is supported primarily by the concept of the virtual socket, implemented by the VirtualSocket class. VirtualSocket is a subclass of java.io.Socket, and supports the full socket API. As is the case with actual sockets, virtual sockets are created in one of two ways: a constructor (or factory) call on a client, or a call to the accept( ) method of a server socket on a server.

Accordingly, the other principal Multiplex concept is the virtual server socket, implemented by two classes: MasterServerSocket, and VirtualServerSocket.

These are both subclasses of java.io.ServerSocket, and both implement the full server socket API. Since virtual sockets are implemented on the foundation of actual sockets, and the creation of actual sockets requires a server socket, we need the support of actual server sockets in the creation of virtual sockets. It is the role of MasterServerSocket to provide that support. The accept( ) method of MasterServerSocket calls super.accept( ) to create an actual socket which is then wrapped in a mechanism which supports one or more virtual sockets. Every Muliplex application requires at least one MasterServerSocket, and the Prime Scenario requires exactly one.

Figure 8:
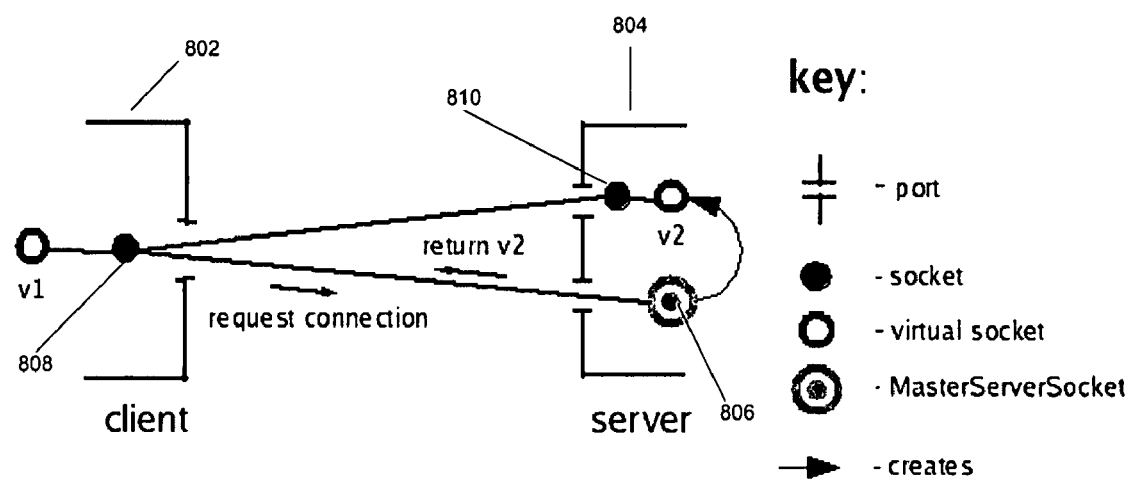
FIG. 8 illustrates a method for setting up a synchronous connection in accordance with one embodiment.

FIG. 8 illustrates a method for setting up a synchronous connection in accordance with one embodiment. A virtual socket v1 of client 802 connects to a MasterServerSocket 806 of server 804, which creates and returns a reference to a new virtual socket v2. In FIG. 8, we have a connection between v1 and v2, which can support synchronous communication but which offers nothing not provided by actual sockets 808, 810.

The support of multiplexed callbacks, however, requires the use of the other virtual server socket class, VirtualServerSocket.

Figure 9:
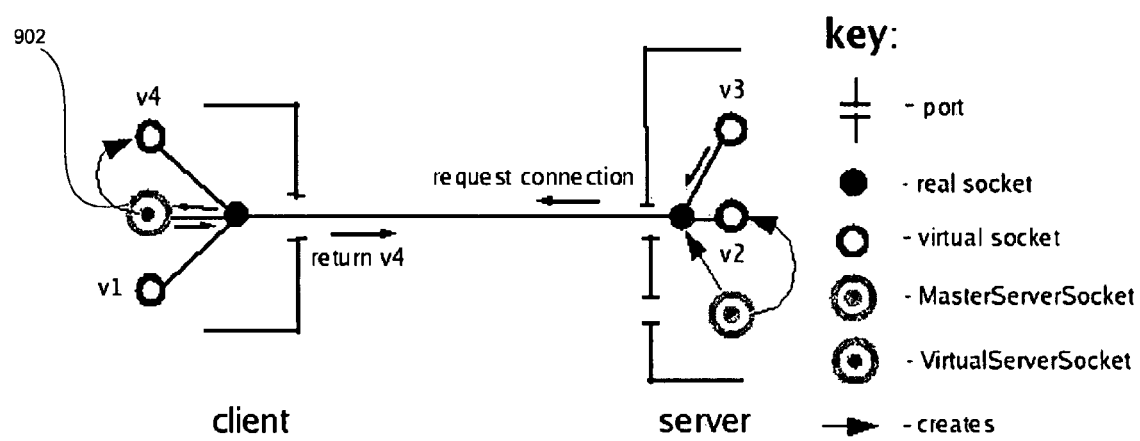
FIG. 9 illustrates a method for setting up a synchronous connection and an asynchronous connection in accordance with one embodiment.

The role of the VirtualServerSocket 902 is illustrated in FIG. 9. Unlike MasterServerSocket, VirtualServerSocket 902 does not depend on superclass facilities, but rather it uses an ordinary client socket, with which implements its own version of the accept( ) method, able to create any number of virtual sockets, all of which share a single port with the VirtualServerSocket 902. It is important to understand how its use of an actual socket determines the nature of a VirtualServerSocket 902. Unlike a server socket, a client socket must be connected to another socket to function, and a VirtualServerSocket 902 has the same property. It follows that a VirtualServerSocket 902 can process requests from just one host, the host to which its actual socket is connected.

A constructor (or factory method, which calls a constructor) is called on the server to create virtual socket v3 to support callbacks. The constructor sends a connection request to the VirtualServerSocket on the client, which creates new virtual socket v4 and sends back to v3 a reference to v4. At this point the Prime Scenario is set up.

Virtual Socket Groups

In order to understand the creation of structures like the Prime Scenario and others described below, it is important to understand the concept of a virtual socket group. A virtual socket group is a set of virtual sockets, and zero or one VirtualServerSockets, sharing a single actual socket. We say that the socket group is based on its actual socket. Depending on the state of its underlying actual socket and the nature of its peer socket group, if any, a socket group may be in one of three states. Let G be a socket group based on actual socket S. Then G may be 1. bound: S is bound but not connected, or
2. connected: S is connected to socket S' and the socket group based on S' does not contain a VirtualServerSocket, or
3. joinable: S is connected to socket S' and the socket group based on S' does contain a VirtualServerSocket.

Although it is possible for a socket to be neither bound nor connected, we do not consider a socket group to exist until its underlying socket is at least bound to a local address. A connected or joinable socket group is said to be visible, and a bound socket group is invisible. A socket group is characterized by the pair of addresses (localAddress, remoteAddress)

where these are the local and remote addresses of the actual socket underlying the socket group. localAddress may take the special form (*, port), where the wildcard value "*" denotes any hostname by which the local host is known. Depending on the state of the socket group, remoteAddress may have the special value undefined, indicating that a connection has not yet been established.

There are two ways of creating a new virtual socket group or of joining an existing socket group: through a binding action or a connecting action. A binding action is either.

1. a call to any of the VirtualServerSocket constructors other than the default constructor (i.e., those with a port parameter), or
2. a call to a bind( ) method in VirtualSocket or VirtualServerSocket.

A connecting action belongs to one of five categories:

1. a call to any VirtualSocket or VirtualServerSocket constructor that requires a remote address (note that unlike java.net.ServerSocket, VirtualServerSocket has such a constructor),
2. a call to a connect( ) method (again, VirtualServerSocket has a nonstandard connect( ) method), 3. a call to VirtualServerSocket.accept( ), 4. a call to MasterServerSocket.accept( ), or 5. a call to MasterServerSocket.acceptServerSocketConnection( ).

Each binding action has an associated local address, and each connecting action as an associated remote address and an optional local address. For binding actions, and connecting actions in the first two categories, the addresses are given explicitly in the method call. For a call to VirtualServerSocket.accept( ), the addresses are those of the socket group to which the server socket belongs, and for the two MasterverSocket methods, the addresses are those of the actual socket they create.

Depending on their associated local and remote addresses and on the socket groups that exist at the time of the action, a binding or connecting action may have the effect of creating a new socket group or adding a new member to an existing socket group. The rules are straightforward, but there is one source of possible confusion, the accidental connection problem discussed below, that must be guarded against. Let V be a virtual socket or virtual server socket undergoing either a binding or connecting action.

1. binding action rule: If there are visible socket groups whose local address matches the action's local address, then V joins one of them chosen at random. Otherwise, a new bound socket group is created and V joins it.

2. connecting action rule:

a. For actions in the first two categories, where V is a VirtualSocket (respectively, a VirtualServerSocket):

i. If the action has a remote address but no local address:

A. If there are any joinable (resp., connected) socket groups with a matching remote address, then V joins one of them chosen at random.

B. If there are no such socket groups, an attempt is made to connect to a MasterverSocket at the remote address, and if the attempt succeeds, a new socket group is created and V joins it.

ii. If the action has both a local address and a remote address:

A. If there is a joinable (resp., connected) socket group with matching addresses, then V joins it B. Otherwise, if the local address (in particular, its port) is currently in use, the action results in a IOException.

C. Otherwise, a new socket group G is created and bound to the local address. Then an attempt is made to connect to a MasterServerSocket at the remote address, and if the attempt succeeds, V joins G.

b. For VirtualServerSocket.accept( ) calls, the new virtual socket joins the socket group to which the server socket belongs.

c. For MasterServerSocket.accept( ) calls, a new socket group is created with the new virtual socket as its first member.

d. For MasterServerSocket.acceptServerSocketConnection( ) calls, a new socket group with zero members is created.

Coding the Prime Scenario

In order to set up the Prime Scenario, the following steps are necessary (the socket names conform to FIG. 9:

1. On the server, create a MasterServerSocket and bind it to port P.

2. On the client, create a virtual socket v1 and connect it to port P.

3. Let Q be the port on the client to which v1 is bound. Create a VirtualServerSocket on the client, bind it to Q, and connect it to P.

4. On the server, create a virtual socket v3 and connect it to port Q.

The Prime Scenario provides an example of creating socket groups. In step 2, a socket group G1 is created on the client through the construction of v1. It enters the connected state, bound to an arbitrary port Q on the client and connected to port P on the server. In step 3 a VirtualServerSocket joins G1 by way of binding to Q on the client and connecting to P on the server. In fact, the socket group rules imply that it is enough to bind the server socket to port Q. Connecting it to P on the server occurs as a side effect of the binding action. Finally, step 4 adds virtual socket v4 to G1. While G1 is being built on the client, a socket group G2 is being built on the server. Step 2 results in the creation of G2, along with its first member, a new virtual socket, v2, returned by the accept( ) method of the MasterServerSocket. Step 4 adds a second member, v3, to G2.

Figure 10:
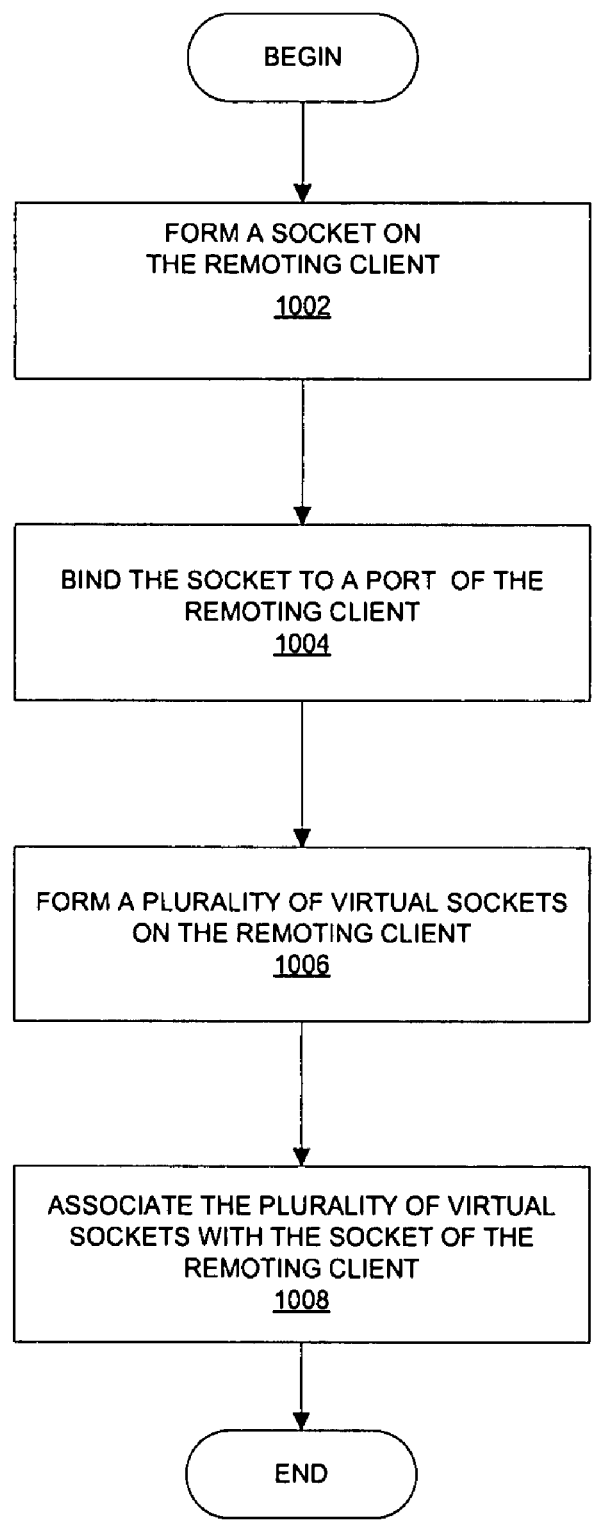
FIG. 10 illustrates a flow diagram of one embodiment of a method for supporting multiple streams of communication over a single pair of sockets.

FIG. 10 illustrates a flow diagram of one embodiment of a method for supporting multiple streams of communication over a single pair of sockets from a client side. At 1002, a socket is formed on the remoting client. At 1004, the socket is bound to a port of the remoting client. At 1006, one more more virtual sockets are formed on the remoting client. At 1008, the virtual sockets are associated with the socket of the remoting client and share the socket and port of the remoting client.

Figure 11:
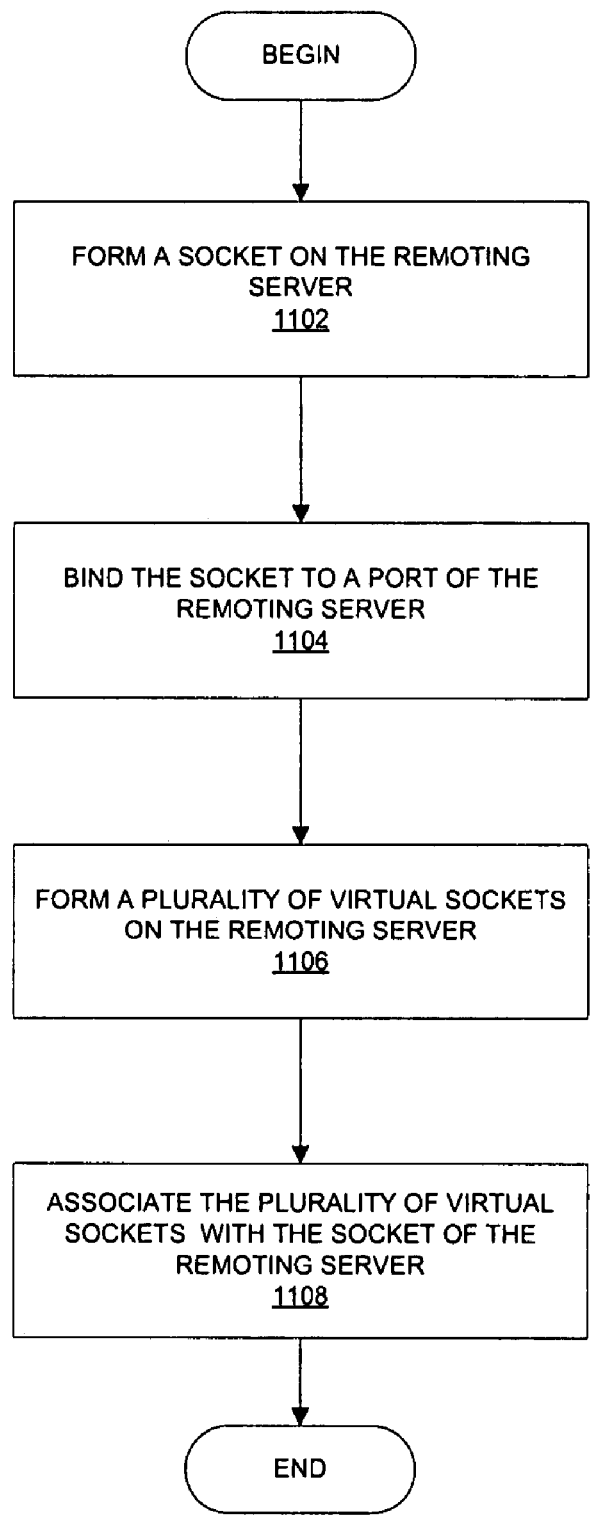
FIG. 11 illustrates a flow diagram of another embodiment of a method for supporting multiple streams of communication over a single pair of sockets.

FIG. 11 illustrates a flow diagram of another embodiment of a method for supporting multiple streams of communication over a single pair of sockets from a server side. At 1102, a socket is formed on the remoting server. At 1104, the socket is bound to a port of the remoting server. At 1106, one more virtual sockets are formed on the remoting server. At 1108, the virtual sockets are associated with the socket of the remoting server and share the socket and port of the remoting server.

One of the primary design goals of the Multiplex subsystem is for virtual sockets and virtual server sockets to demonstrate behavior as close as possible to their real counterparts, and, indeed, they implement complete socket and server socket APIs. However, they are necessarily different in some respects, and it follows that the multiplex invoker is somewhat different than the socket invoker. In particular, there are three areas specific to the multiplex invoker that must be understood in order to use it effectively:

1. Establishing on the server an environment prerequisite for creating multiplex connections 2. Configuring the client for multiplexed method invocations and callbacks 3. Shutting down invoker groups.

Up the Server

There are two kinds of MultiplexServerInvokers, master and virtual, corresponding to the two kinds of virtual server sockets: MasterServerSocket and VirtualServerSocket. Briefly, the difference between the two virtual server socket classes is that a MasterServerSocket is derived from java.net.ServerSocket and its accept( ) method is implemented by way of the inherited method super.accept( ). A MasterServerSocket can accept connect requests from multiple machines. A VirtualServerSocket, on the other hand, is based on an actual socket connected to another actual socket on some host H, and consequently a VirtualServerSocket can accept connect request only from H.

Each multiplex connection depends on a pair of connected real sockets, one on the client host and one on the server host, and this connection is created when an actual socket contacts an actual server socket. It follows that a multiplex connection begins with a connection request to a MasterServerSocket. Once the connection is established, it is possible to build up virtual socket groups, consisting of virtual sockets (and as most one VirtualServerSocket) revolving around the actual socket at each end of the connection. Each virtual socket in a socket group at one end is connected to a virtual socket in the socket group at the other end.

Master and virtual MultiplexServerInvokers assume the characteristics of their server sockets: MasterServer-Socket and VirtualServerSocket, respectively. That is, a master MultiplexServerInvoker can accept requests from any host, while a virtual MultiplexServerInvoker can accept requests only from the particular host to which it has a multiplex connection. Since a multiplex connection begins with a connection request to a MasterServer-Socket, it follows that the use of the multiplex invoker must begin with a connection request from the client (made by either a MultiplexClientInvoker or a virtual MultiplexServerInvoker: see below) to a master Multiplex-ServerInvoker on the server. The master MultiplexServerInvoker responds by "cloning" itself (metaphorically, not necessarily through the use of clone( )) into a virtual MultiplexServerInvoker with the same parameters and same set of invocation handlers but with a VirtualServerSocket belonging to a new socket group. In so doing the master MultiplexServerInvoker builds up a server invoker farm of virtual MultiplexServerInvokers, each in contact with a different MultiplexClientInvoker over a distinct multiplex connection. The virtual Multiplex-ServerInvokers do the actual work of responding to method invocation requests, sent by their corresponding MultiplexClientInvokers through virtual sockets in a socket group at the client end of a multiplex connection to virtual sockets created by the VirtualServerSocket in the socket group at the server end of the connection. Note that virtual MultiplexServerInvokers share data structures with the master, so that registering invocation handlers with the master makes them available to the members of the farm. The members of a master MultiplexServerInvoker's invoker farm are accessible by way of the methods:

1. MultiplexServerInvoker.getServerInvokers( ) and
2. MultiplexServerInvoker.getServerInvoker(InetSocketAddress)

The latter of which returns a virtual MultiplexServerInvoker keyed on the address to which its VirtualServer-Socket is connected. When the master MultiplexServerInvoker shuts down, its farm of virtual invokers shuts down as well.

There are two ways of constructing a virtual MultiplexServerInvoker, one being the cloning method just discussed. It is also possible to construct one directly. Once a multiplex connection is established, a virtual MultiplexServerInvoker can be created with a VirtualServerSocket belonging to a socket group at one end of the connection. The MultiplexServerInvoker constructor determines whether to create a virtual or master invoker according to the presence or absence of certain parameters, discussed below, that may be added to its InvokerLocator. Server rules 1 through 3 described below result in the construction of a virtual MultiplexServerInvoker, and server rule 4 (the absence of these parameters) results in the construction of a master MultiplexServerInvoker. Setting up the server, then, is simply a matter of starting a master MultiplexServerInvoker with a simple InvokerLocator, unadorned with any parameters specific to the multiplex invoker. As always, the server invoker is not created directly but by way of a Connector, as in the following:

Connector connector=new Connector( );
Connector.setInvokerLocator("multiplex://demo.JBoss.com: 8080");
Connector.create( )
Connector.start( )
Setting Up the Client Before multiplex connections can be established, a master MultiplexServerInvoker must be created as described in the previous section. For example, the Prime Scenario would begin with starting a master MultiplexServerInvoker on the server host, followed by starting, on the client host, a MultiplexClientInvoker C and a virtual MultiplexServerInvoker S (in either order). The first to start initiates a multiplex connection to the master MultiplexServerInvoker and requests the creation of a virtual MultiplexServerInvoker. Note that it is crucial for C and S to know that they are meant to share a multiplex connection, i.e., that they are meant to belong to the same invoker group. Consider the following attempt to set up a shared connection between hosts bluemonkey.acme.com and demo.JBoss.com. First, C is initialized on host bluemonkey.acme.com with the InvokerLocator multiplex://demo.JBoss.com:8080, and, assuming the absence of an existing multiplex connection to demo.JBoss.com:8080, a new virtual socket group based on a real socket bound to an arbitrary port, say 32000, is created. Then S is initialized with InvokerLocator multiplex://bluemonkey.acme.com:4444, but since it needs to bind to port 4444, it is unable to share the existing connection. [Actually, the example is slightly deceptive, sincemultiplex://bluemonkey.acme.com:4040 would result in the creation of a master MultiplexServerInvoker. But if it were suitably extended with the parameters discussed below so that a virtual MultiplexServerInvoker were created, the virtual invoker would be unable to share the existing connection.]

So C and S need to agree on the address and port of the real socket underlying the virtual socket group they are intended to share on the client host and the address and port of the real socket underlying the peer virtual socket group on the server host. Or, more succinctly, they must know that they are meant to belong to the same invoker group. Note the relationship between an invoker group and the virtual socket group which supports it: a MultiplexClientInvoker uses virtual sockets in its underlying virtual socket group, and a MultiplexServerInvoker in an invoker group has a VirtualServerSocket that creates virtual sockets in the underlying virtual socket group.

C and S each get half of the information necessary to identify their invoker group directly from their respective InvokerLocators. In particular, C gets the remote address and port, and S gets the binding address and port. The additional information may be provided through the use of invoker group parameters, which may be communicated to C and S in one of two ways:

1. they may be appended to the InvokerLocator passed to the Client which creates C and/or to the Invoker-Locator passed to the Connector which creates S
2. they may be stored in a configuration Map which is passed to the Client and/or Connector.

In either case, there are two ways in which the missing information can be supplied to C and S:

1. The information can be provided explicitly by way of invoker group parameters:
   a. multiplexBindHost and multiplexBindPort parameters can be passed to C, and
   b. multiplexConnectHost and multiplexConnectPort parameters can be passed to S.
2. C and S can be tied together by giving them the same multiplexId, supplied by invoker group parameters:
   a. clientMultiplexId, for the MultiplexClientInvoker, and
   b. serverMultiplexId, for the MultiplexServerInvoker.

Giving them matching multiplexIds tells them that they are meant to belong to the same invoker group and that they should provide the missing information to each other. The behavior of a starting MultiplexClientInvoker C is governed by the following four client rules:

1. If C has a clientMultiplexId parameter, it will use it to attempt to find a MultiplexServerInvoker S with a serverMultiplexId parameter with the same value. If it succeeds, it will retrieve binding host and port values, create or reuse a suitable multiplex connection to the server, and start. Moreover, if S was unable to start because of insufficient information (server rule 3), then C will supply the missing information and S will start. Note that in this situation C will ignore any multiplexBindHost and multiplexBindPort parameters passed to it.

2. If C does not find a MultiplexServerInvoker through a multiplexId (either because it did not get a clientMultiplexId parameter or because there is no MultiplexServerInvoker with a matching multiplexId), but it does have multiplexBindHost and multiplexBindPort parameters, then it will create or reuse a suitable multiplex connection to the server, and start. Also, if it has a multiplexId, it will advertise itself for the benefit of a MultiplexServerInvoker that may come along later (see server rule 1).

3. If C has a multiplexId and neither finds a MultiplexServerInvoker with a matching multiplexed nor has multiplexBindHost and multiplexBindPort parameters, then it will not start, but it will advertise itself so that it may be found later by a MultiplexServerInvoker (see server rule 1).

4. If C has neither clientMultiplexId nor multiplexBindHost and multiplexBindPort parameters, it will create or reuse a multiplex connection from an arbitrary local port to the host and port given in its InvokerLocator, and start.

Similarly, the behavior of a starting MultiplexServerInvoker S is governed by the following four server rules:

1. If S has a serverMultiplexId parameter, it will use it to attempt to find a MultiplexClientInvoker C with a matching clientMultiplexId. If it succeeds, it will retrieve server host and port values, create a VirtualServer-Socket, create or reuse a suitable multiplex connection to the server, and start. Moreover, if C was unable to start due to insufficient information (client rule 3), then S will supply the missing information and C will start. Note that in this situation S will ignore multiplexConnectHost and multiplexConnectPort parameters, if any, in its InvokerLocator.

2. If S does not find a MultiplexClientInvoker through a multiplexId (either because it did not get a server-MultiplexId parameter or because there is no MultiplexClientInvoker with a matching multiplexId), but it does have multiplexConnectHost and multiplexConnectPort parameters, then it will create a VirtualServer-Socket, create or reuse a suitable multiplex connection to the server, and start. Also, if it has a multiplexId, it will advertise itself for the benefit of a MultiplexClientInvoker that may come along later (see client rule 1).

3. If S has a multiplexId and neither finds a MultiplexClientInvoker with a matching multiplexId nor has multiplexConnectHost and multiplexConnectPort parameters, then it will not start, but it will advertise itself so that it may be found later by a MultiplexClientInvoker (see client rule 1).

4. If S has neither serverMultiplexId nor multiplexConnectHost and multiplexConnectPort parameters, it will create a MasterServerSocket bound to the host and port in its InvokerLocator and start.

Shutting Down Invoker Groups

A virtual socket group will shut down, releasing a real socket and a number of threads, when (1) its last member has closed and (2) the socket group at the remote end of the multiplex connection agrees to the proposed shut down. The second condition prevents a situation in which a new virtual socket tries to join what it thinks is a viable socket group at the same time that the peer socket group is shutting down. So for a virtual socket group to shut down, all members at both ends of the connection must be closed.

The implication of this negotiated shutdown mechanism is that as long as the VirtualServerSocket used by a virtual MultiplexServerInvoker remains open, resources at the client end of the connection cannot be freed, and for this reason it is important to understand how to close virtual MultiplexServerInvokers.

There are three ways in which a virtual MultiplexServerInvoker that belongs to a master MultiplexServerInvoker's invoker farm can shut down.

When a master MultiplexServerInvoker is closed, it closes all of the virtual MultiplexServerInvokers it created.

A virtual MultiplexServerInvoker can be retrieved by calling either MultiplexServerInvoker.getServerInvokers( ) or MultiplexServerInvoker.getServerInvoker(InetSocketAddress) on its master MultiplexServerInvoker and then closed directly.

When the accept( ) method of its VirtualServerSocket times out, and when it detects that all multiplex invokers in the invoker group at the client end of the connection have shut down, a virtual MultiplexServerInvoker will shut itself down. Note that when all members leave an invoker group, it is guaranteed not to be revived, i.e., no new members may join.

The third method insures that without any explicit intervention, closing all multiplex invokers on the client (by way of calling Client.disconnect( ) and Connector.stop( )) is guaranteed to result in the eventual release of resources. The timeout period may be adjusted by setting the timeout parameter (see below). Alternatively, the second method, in conjunction with the use of MultiplexServerInvoker.isSafeToShutdown( ), which returns true on MultiplexServerInvoker M if and only if (1) M is not virtual, or (2) all of the multiplex invokers in the invoker group at the client end of M's connection have shut down. For example, a thread could be dedicated to looking for useless MultiplexServerInvokers and terminating them before their natural expiration through timing out.

In the above description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.).

Thus, a method and apparatus for providing a multiplex transport between a remoting client and a remoting server has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    forming a client socket on a remoting client;
    binding the client socket to a port of the remoting client, the client socket coupled to a server socket of a remoting server;
    forming a plurality of virtual sockets on the remoting client; and
    associating the plurality of virtual sockets with the client socket of the remoting client, the plurality of virtual sockets sharing the client socket and the port of the remoting client.

2. The method of claim 1 further comprising:
    binding the plurality of virtual sockets to the port of the remoting client; and
    connecting the plurality of virtual sockets to the port of the remoting server.

3. The method of claim 1 further comprising:
    forming a virtual server socket on the remoting client;
    binding the virtual server socket to the port of the remoting client; and
    connecting the virtual server socket to the port of the remoting server.

4. The method of claim 1 wherein forming the plurality of virtual sockets further comprises:
    performing a factory call on the remoting client.

5. The method of claim 1 wherein forming the plurality of virtual sockets further comprises:
    performing a call to an accept method of the server socket on the remoting server.

6. A computer-implemented method comprising:
    forming a server socket on a remoting server;
    binding the server socket to a port of the remoting server, the server socket coupled to a client socket of a remoting client;
    forming a plurality of virtual sockets on the remoting server; and
    associating the plurality of virtual sockets with the server socket of the remoting server, the plurality of virtual sockets sharing the server socket and the port of the remoting server.

7. The method of claim 6 further comprising:
    binding the plurality of virtual sockets to the port of the remoting server; and
    connecting the plurality of virtual sockets to the port of the remoting client.

8. The method of claim 6 further comprising:
    forming a master server socket on the remoting server; and
    binding the master server socket to the port of the remoting server.

9. The method of claim 6 wherein forming the plurality of virtual sockets further comprises:
    performing a factory call on the remoting client.

10. The method of claim 6 wherein forming the plurality of virtual sockets further comprises:
    performing a call to an accept method of the server socket on the remoting server.

11. A remoting client comprising:
    a client remote access application comprising an application programming interface (API); and
    a client invoker, executable by a processing device and coupled to the client remote access application, the socket invoker comprising a multiplex invoker,
    wherein the multiplex invoker is configured to form a client socket on the remoting client, to bind the client socket to a port of the remoting client, to couple the client socket to a server socket of a remoting server, to form a plurality of virtual sockets on the remoting client, and to associate the plurality of virtual sockets with the client socket of the remoting client, the plurality of virtual sockets sharing the client socket and the port of the remoting client.

12. The remoting client of claim 11 wherein the multiplex invoker is to further bind the plurality of virtual sockets to the port of the remoting client, and to connect the plurality of virtual sockets to the port of the remoting server.

13. The remoting client of claim 11 wherein the multiplex invoker is to further form a virtual server socket on the remoting client, to bind the virtual server socket to the port of the remoting client, and to connect the virtual server socket to the port of the remoting server.

14. The remoting client of claim 11 wherein the multiplex invoker is to form the plurality of virtual sockets by performing a factory call on the remoting client.

15. The remoting client of claim 11 wherein the multiplex invoker is to form the plurality of virtual sockets by performing a call to an accept method of the server socket on the remoting server.

16. A remoting server comprising:
an invocation handler; and
a server invoker, executable by a processing device and coupled to the invocation handler, the server invoker comprising a multiplex invoker,
wherein the multiplex invoker is to form a server socket on the remoting server, to bind the server socket to a port of the remoting server, to couple the server socket to a client socket of the remoting client, to form a plurality of virtual sockets on the remoting server, and to associate the plurality of virtual sockets with the server socket of the remoting server, the plurality of virtual sockets sharing the server socket and the port of the remoting server.

17. The remoting server of claim 16 wherein the multiplex invoker is to bind the plurality of virtual sockets to the port of the remoting server, and to connect the plurality of virtual sockets to the port of the remoting client.

18. The remoting server of claim 16 wherein the multiplex invoker is to form a master server socket on the remoting server, and to bind the master server socket to the port of the remoting server.

19. The remoting server of claim 16 wherein the multiplex invoker is to form the plurality of virtual sockets further by performing a factory call on the remoting client.

20. The remoting server of claim 16 wherein the multiplex invoker is to form the plurality of virtual sockets by performing a call to an accept method of the server socket on the remoting server.

21. A non-transitory machine-accessible storage medium including data that, when accessed by a machine, cause the machine to perform a method comprising:
forming a client socket on a remoting client;
binding the client socket to a port of the remoting client, the client socket coupled to a server socket of a remoting server;
forming a plurality of virtual sockets on the remoting client; and
associating the plurality of virtual sockets with the client socket of the remoting client, the plurality of virtual sockets sharing the client socket and the port of the remoting client.

22. The storage medium of claim 21 wherein the method further comprises:
binding the plurality of virtual sockets to the port of the remoting client; and
connecting the plurality of virtual sockets to the port of the remoting server.

23. The storage medium of claim 21 wherein the method further comprises:
forming a virtual server socket on the remoting client;
binding the virtual server socket to the port of the remoting client; and
connecting the virtual server socket to the port of the remoting server.

24. The storage medium of claim 21 wherein forming the plurality of virtual sockets further comprises:
performing a factory call on the remoting client.

25. The storage medium of claim 21 wherein forming the plurality of virtual sockets further comprises:
performing a call to an accept method of the server socket on the remoting server.

26. A non-transitory machine-accessible storage medium including data that, when accessed by a machine, cause the machine to perform a method comprising:
forming a server socket on the remoting server;
binding the server socket to a port of the remoting server, the server socket coupled to a client socket of the remoting client;
forming a plurality of virtual sockets on the remoting server; and
associating the plurality of virtual sockets with the server socket of the remoting server, the plurality of virtual sockets sharing the server socket and the port of the remoting server.

27. The storage medium of claim 26 wherein the method further comprises:
binding the plurality of virtual sockets to the port of the remoting server; and
connecting the plurality of virtual sockets to the port of the remoting client.

28. The storage medium of claim 26 wherein the method further comprises:
forming a master server socket on the remoting server; and
binding the master server socket to the port of the remoting server.

29. The storage medium of claim 26 wherein forming the plurality of virtual sockets further comprises:
performing a factory call on the remoting client.

30. The storage medium of claim 26 wherein forming the plurality of virtual sockets further comprises:
performing a call to an accept method of the server socket on the remoting server.

* * * * *